July 18, 1939. E. O. NORRIS 2,166,366

MEANS AND METHOD OF PRODUCING METALLIC SCREENS

Original Filed Nov. 30, 1935 3 Sheets-Sheet 1

INVENTOR.
Edward O. Norris
BY
ATTORNEYS.

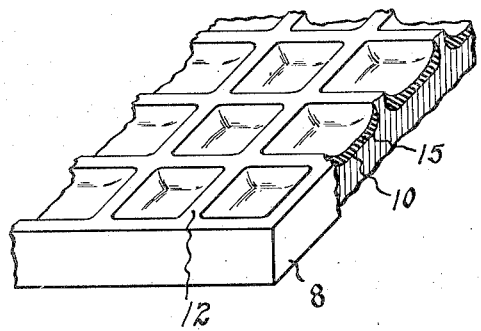
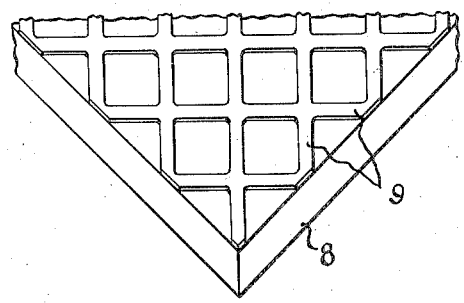
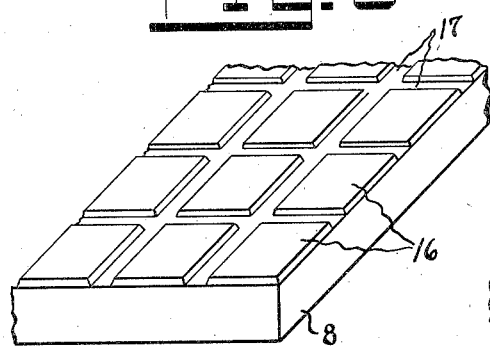
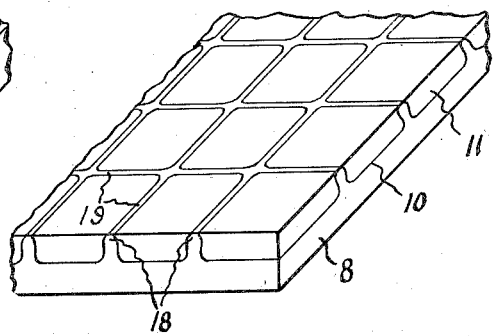
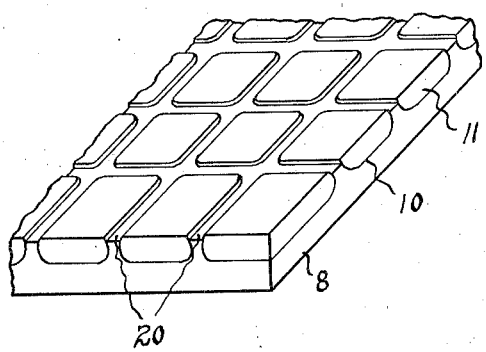
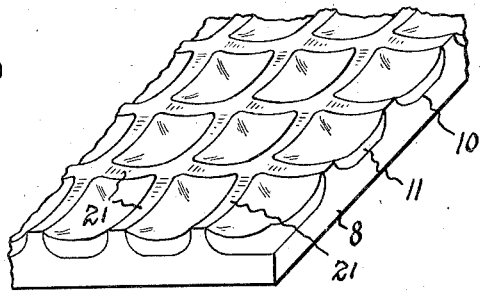

July 18, 1939.                E. O. NORRIS              2,166,366
            MEANS AND METHOD OF PRODUCING METALLIC SCREENS
                Original Filed Nov. 30, 1935    3 Sheets-Sheet 3
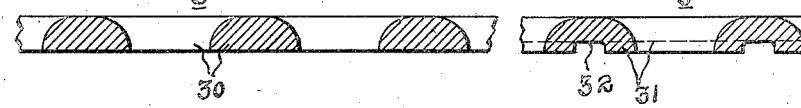
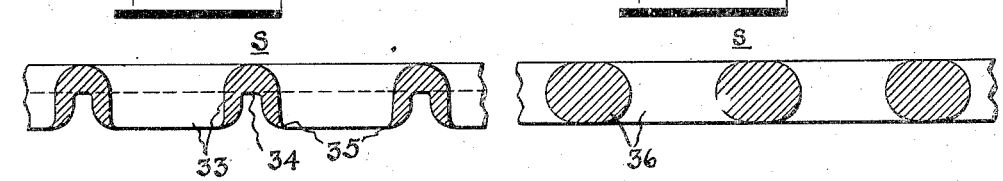
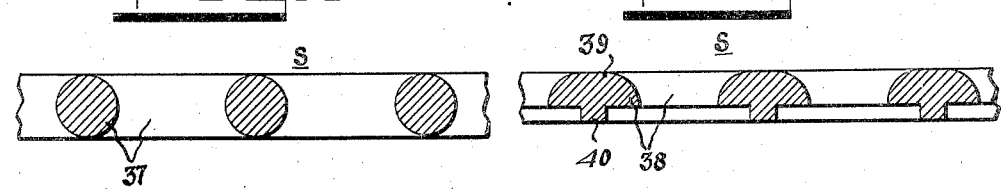
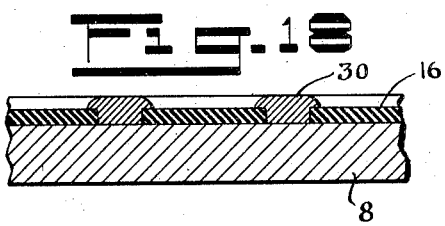
INVENTOR.
Edward O. Norris
BY
ATTORNEYS.

Patented July 18, 1939

2,166,366

UNITED STATES PATENT OFFICE 2,166,366

MEANS AND METHOD OF PRODUCING METALLIC SCREENS

Edward O. Norris, Westport, Conn., assignor to Edward O. Norris, Inc., New York, N. Y., a corporation of New York Application November 30, 1935, Serial No. 52,334
Renewed December 14, 1938

10 Claims. (Cl. 204—6)

This invention is for an improved method and apparatus by means of which metallic screens or perforated metal sheets having any particular number of desired openings per square inch may be produced.

More specifically an object of this invention is to provide improved apparatus and methods by means of which metallic screens may be electrolytically deposited.

An important object of this invention is the production of screens of this type by improved and relatively inexpensive apparatus and methods.

A subsidiary object of this invention is the provision of improved forms of screen matrices and methods of producing the same.

Another subsidiary object of this invention involves improved methods of producing metallic screens on such matrices.

A still further object of the invention involves methods of treating electrolytically deposited screens for imparting to them desired characteristics of form and finish.

A still further object of this invention is the production of metal screens capable of a desirable amount of stretching without injury for certain fields of use.

The other and more detailed objects of this invention will become clearly apparent to those familiar with this art from the following detailed description of the methods, apparatus and products which comprise the complete invention.

This invention resides substantially in the combination, construction, arrangement, relative location of parts, steps and series of steps, all in accordance with the written description and attached drawings.

The inventions herein disclosed are in some respects related to the inventions disclosed in my copending application Serial No. 756,224, filed December 6, 1934, for Metallic screens and formation thereof.

In the drawings:

Figure 6 is an enlarged perspective view partly in cross section of a portion of a completed modified form of matrix;

Figure 7 is similar to Figure 3 but shows a modified matrix partially completed;

Figures 8, 9, 10 and 11 are enlarged perspective views of portions of completed but modified forms of matrices;

Figures 12 to 17 inclusive are enlarged cross sectional views through portions of screens completed in accordance with the various methods of this invention; and Figure 18 is a cross section through the screen of Figure 8, showing a method of locking the resist areas in place.

It is hardly necessary to set forth here the desirability of improved methods for producing metal screens as now commonly employed in many industries. The use of such screens is extensive and growing notwithstanding the fact that at the present time the production thereof is a relatively slow and expensive process, making the finished product costly. A prime object of this invention is to reduce the time and difficulties of metallic screen production, and to thereby reduce the ultimate cost thereof.

It is to be particularly noted that the screens of this invention are to be distinguished from woven wire screens, punched metal screens, and the like.

In accordance with this invention the highly desirable object is obtained of producing metallic screens of relatively coarse mesh or of extremely fine mesh. For example, it is possible, in accordance with this invention, to produce metal screens having one million holes or openings per square inch.

Since the full nature of the invention will be best appreciated by a detailed description of the apparatus and methods involved, such a description will now be given in connection with the attached drawings.

The first step in the production of a matrix upon which metal screens may be electrolytically deposited consists in photographing on a wet or dry plate a highly illuminated white area through a standard cross line half tone screen having the desired count. This is preferably done with a photo-engraving camera with an exposure mask or "stop" timed to give the desired pattern on the negative. For example, as is known in the photographic art, by the proper arrangement of the apparatus, form of mask, and an exposure of the proper period the images on the negative of the openings in the half tone screen may be made of various configurations such as circular, rectangular with square corners, rectangular with rounded corners, and the like.

Figure 1:
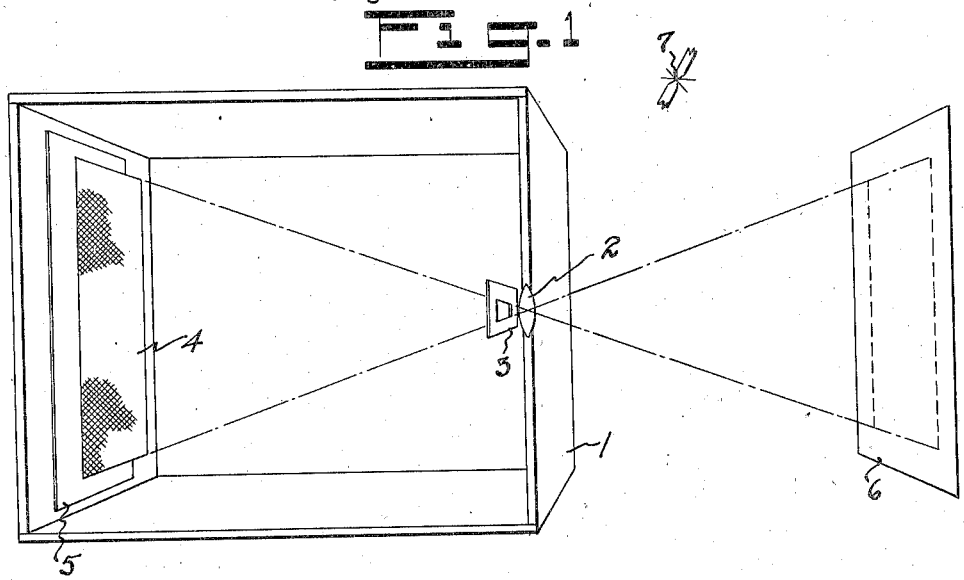
Figure 1 is a diagrammatic perspective view of camera apparatus employed in producing matrices in accordance with this invention.

In Figure 1 there has been diagrammatically illustrated a form of apparatus suitable for carrying out this step. The camera box or casing is diagrammatically illustrated at 1, having the lens system 2 in the front thereof, and a suitable mask 3 aligned with the lens. At 4 is diagrammatically illustrated a half tone screen in back of which is positioned the sensitized negative material in the form of either a wet or dry plate. Positioned in front of the camera is illustrated a white surface which may be for example a sheet of white paper which is focused upon the negative by the lens system 2. This white surface is illuminated from any suitable light source, as indicated at 7, of which an arc or sun lamp are examples. It is of course apparent that the white surface may be illuminated by daylight when it is sufficiently intense.

The exposed negative is then developed and fixed in accordance with well known photographic processes and, of course, in accordance with the particular type or kind of negative employed.

A plate of polished copper or other suitable metal of convenient thickness and of the required size is thoroughly cleaned on one side and then covered with a sensitized coating, as for example a sensitized glue, such as one formed by mixing 7 ounces (avoir.) of clarified glue with 16 fluid ounces of water, 6 drams of ammonium bi-chromate, the albumen of 8 eggs, and 8 drops of ammonia. This sensitized coating is applied to the cleaned, polished surface of the copper plate in accordance with practice well known in the photo-engraving art, to form a thin uniform film on the plate surface. This coating is then dried, and if desired, by the judicious application of heat.

The previously prepared negative is then carefully printed on to the above sensitized metal plate by contact printing preferably in a vacuum frame employing an arc lamp, a sun lamp, or daylight as a source of illumination. The exposure of the sensitized film on the copper plate renders the portions of the coating exposed to light insoluble in water and leaves the unexposed portions soluble. When the negative is produced in the camera the openings in the half tone screen permit full exposure of the sensitized surface of the negative while the lines of the screen mask the negative, with the result that the developed and fixed negative consists of an opaque area separated by fine transparent lines representing respectively the openings in and the lines of the half tone screen.

In printing this negative on to the sensitized coating of the copper plate the light passes through the transparent lines of the negative to expose the adjacent portions of the sensitized coating while the opaque areas prevent the passage of light. The result is that the exposed coating on the plate or positive is rendered insoluble at the portions corresponding to the lines of the half tone screen, and the portions corresponding to the openings or apertures remain unexposed and soluble. The exposed copper plate is then developed or washed out with water so that the soluble portions are removed. The plate is then "burned in", which consists in heating the plate to a temperature of about 300 degrees F., to fuse or harden insoluble portions of the coating to form them into a sort of enamel which firmly adheres to the surface of the plate. The enamel surface is then thoroughly scrubbed with a mixture of salt and ferric chloride followed by washing and drying.

Figure 2:
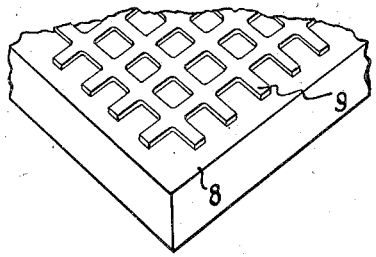
Figure 2 is a perspective enlarged view of a portion of a partially completed matrix.

The resulting product is illustrated in Figure 2. The base or copper plate is illustrated at 8 and the burned in or enamel coating is illustrated at 9. As previously explained, it consists of a series of intersecting lines so that that plate is really a facsimile of the original half tone screen. The printed plate 8 is then carefully inspected and any defective parts are "spotted out" with asphaltum and the entire plate is then "squared up" by painting a straight square marginal line around the screen with asphaltum. The plate is again thoroughly cleaned with salt and ferric chloride and then washed and dried.

Figure 3:
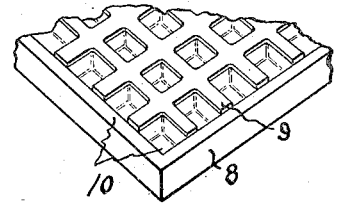
Figure 3 is a similar view illustrating the matrix of Figure 2 after etching.

This plate, which still has the form and appearance illustrated generally in Figure 2 (the marginal line not being shown) is then immersed face down in a bath of ferric chloride until the unprotected metal, that is the square faces between the lines (Figure 2) is etched away to the required depth, which in the case of a 120 line screen would be about 0.002 to 0.0035 inch. The result is illustrated in Figure 3. The spaces between the lines 9 have been etched away to the depth indicated above, and as diagrammatically depicted in Figure 3, at 10.

The proto-resist represented by the lines 9 is now removed from the plate by the application of a solution of sodium cyanide which dissolves the photo-resist and completely removes it from the face of the plate.

The plate 8 is then filled with colored shellac and carefully inspected, and any missing depressions are carefully punched in with pointed needles with the aid of a magnifying glass, and the resulting raised surface caused by the punching operation is rubbed down level with the face of the plate. The depressions 10 are then washed out and filled with a colored shellac or any suitable plastic and preferably one which may be hardened such as a phenolythic condensation product, of which "Bakelite" is an example. The depressions are filled substantially level with the face of the plate, which result may be secured by using a rubber squeegee. Any filling material which remains on top of the plate is removed by scrubbing the face of the plate with pumice powder and water.

It is pointed out that it is preferable to use a Bakelite cement for filling the depressions which will harden upon heating. When employed the plate is, after the filling of the depressions, baked for about one hour to harden the filling. It has been found desirable to apply the filling in several layers, which are each hardened before the application of the succeeding layer. This variation leads to a variation illustrated in Figure 4, which will now be described.

Figure 4:
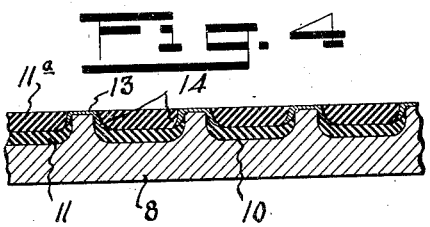
Figure 4 is a cross sectional view of a portion of the matrix illustrating a modified procedural step in the production thereof.

Plate 8 of Figure 3 has its depressions 10 partially filled with the cement as indicated at 11. This cement is then heat treated to harden it or allowed to dry, depending upon the particular cement employed. The face of the plate is then given a thin coating of nickel, preferably by electrolytic deposition. The bottom of the depressions and partway up the side walls thereof being protected by the filling 11 receives no coating. The exposed top portion, as indicated at 13 is, however, covered with the thin nickel coating as illustrated at 13. At the surface of the filling 11 the nickel coating 13 spreads or "fans out", as indicated at 14 to leave a sort of flared edge. The plated sheet is then washed and dried and the depressions are built up to the surface of the top of the nickel coating, as indicated in Figure 4 by an additional filling 11a of cement, which is hardened by heat in the case of the use of cement of that type.

The above mentioned preferable procedure of applying the filling in several layers is thus followed, which gives a filling more resistant to the removal during later treatment of the matrix. In addition the nickel coating is locked in place by the fillings and also serves to aid in locking the fillings in place, thus giving a stronger more compact matrix. The use of the nickel coating is also advantageous in the later steps of depositing a screen thereon, and stripping it therefrom.

Figure 5:
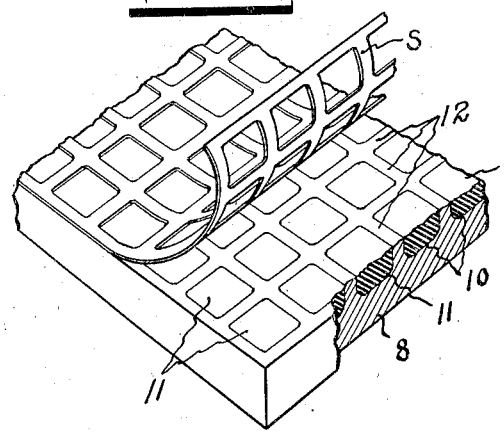
Figure 5 is a view similar to Figure 3 after final processing, showing a portion of a completed matrix and illustrating a screen electrolytically deposited thereon and partially stripped therefrom.

Figure 5 illustrates the matrix after it is finished and the plan view thereof will be the same whether or not a nickel coating is employed. It will be remembered that when the fillings have set the entire face of the matrices is rubbed over with pumice powder and water to thoroughly clean it. It is of course washed and dried to remove the cleaning material. In the case where the depressions are filled with a single layer of cement the exposed areas 12 of the face of the matrix may be given a nickel coating, producing a result similar to that illustrated in Figure 4, but one in which the nickel coating is not locked in by the filling.

The above description sets forth one method of producing a matrix in accordance with this invention, and a slight modification thereof.

A further and more flexible method of producing the matrix will now be described. In this case instead of employing a standard cross line half tone screen a screen is employed having parallel alternate opaque and transverse lines thereon of the required "count". A metal, preferably a copper plate is then sensitized as described above by the application of a light sensitive coating to one face thereof. This screen is then printed through directly onto the sensitized plate in a vacuum printing frame by exposure to a suitable light source. The screen is then rotated through a desired angle, as for example a 90 degree angle, so that the lines on the screen extend at right angles to the lines that have been printed on the sensitized plate. The plate and screen are again exposed to a suitable light source so that the lines of the screen are printed in their new position on the sensitized plate. The plate is then developed by washing out as before, and then "burned in" as described before. This plate is then etched, cleaned, filled and nickel plated, if desired, as previously described. By means of this method a more flexible procedure is provided and matrices may be produced from which screens of various aperture formation may be made.

Figure 7 illustrates the developed and "burned in" plate thus produced. The metal or copper plate is indicated at 8 and the "burned in" areas at 9. This partially completed matrix is similar to that of Figure 2, but the lines 9 appear thereon parallel to the diagonals of the plate as distinguished from the lines 9 of Figure 2 which are parallel to the edges thereof.

It has been found from practice that this method of producing a matrix is advantageous in that a more even arrangement of the lines results without any defective spots requiring the tedious and difficult job of "spotting out" the defects. Those skilled in the art will immediately recognize the above prepared matrices as of the intaglio form. The intaglio form of matrix is preferable since in use when damaged it may be more easily repaired. It is far easier to repair the depressions in the plate than to true up the lines in the other type of plate. It is also easier to apply a stripping film.

In the use of these matrices the face is first coated with an extremely fine film of wax. An example of a suitable wax consists of two-thirds beeswax and one-third carnauba wax, dissolved in two hundred parts of gasoline or naphtha. A small quantity of this wax is poured in the middle of the face of the plate, which is laid flat. The wax is then spread over the plate with a stiff brush crossing the strokes until the wax is spread out evenly and thinly and until it begins to set. The plate is then heated to about 150 degrees F. and then thoroughly scrubbed with a brush. This plate is then immersed in an acid copper depositing solution where a copper screen is desired. The plate is then made the cathode of an electric current source, and of course the other terminal of the source is connected to a copper anode. A thin coating is then deposited on the plate employing a current density of the order of 18 amperes per square foot of plate. It is well to cool the plate after the heating and "scrubbing in" operation before immersion. Copper is deposited on the plate for about five minutes, after which it is removed and washed over with a soft brush to insure a clean deposit of copper thereon. The plate is again immersed and the plating continued with occasional removal and scrubbing until the deposit has built up to a desired thickness. The plating operation in normal cases continues from a half hour to an hour and a half. It is then removed, washed and dried. The formed screen is then stripped from the plate by inserting a knife or the like under one edge and lifting the edge of the screen a sufficient amount so that it may be wrapped around a small roller which is then rolled across the plate to strip the entire screen evenly therefrom with little danger of tearing.

Figure 5 illustrates a screen 5 partly stripped from the plate. As is clear from the drawings, the copper is deposited on the surfaces 12 but does not deposit on the surface of the fillings 11 because, as is well known, they are non-conductive. It will be recognized that the wax coating is employed to facilitate stripping.

Before describing further desirable operations on the stripped screen additional methods of producing matrices will be described. A negative is made from a half tone screen which is in exact reverse in pattern to that used in forming the above described intaglio types of matrices. The reverse pattern negative is formed by methods well known in the photographic art. A print of this reverse negative is then made upon a light sensitized metal plate coating as before. In this case a coating such as "glue top" may be used, which is a sensitized coating material well known in the photo-engraving art.

The reverse negative is then printed in contact printing on to the sensitized coating, which is then developed by washing and "burned in" to leave a resist on the areas corresponding to the apertures in the half tone screen. Such a matrix is illustrated in Figure 8. The reverse negative now renders the portions corresponding to the holes in the half tone screen insoluble while the portions corresponding to the lines between the holes remain soluble. Thus, when the plate is washed out and "burned in" it will have the appearance as illustrated in Figure 8, where the "burned in" material is indicated at 16, and the exposed portions of the plate 8 indicated at 17. The areas 16 represent the "glue top" resist which is essentially an enamel resulting from the burning in, protecting the areas thereunder. The spaces between the enameled areas 16, as illustrated at 17, comprise exposed portions of the plate 8. This matrix, after waxing as described above, may then have a metal deposit formed thereon to provide a screen which may be stripped therefrom. As distinguished from the previous matrices it will be apparent that the stripping comes from below the tops of the resist which is not so desirable for obvious reasons. The arrangement is, however, entirely practical.

Instead of "glue top" the well known sensitized coating material known as "cold top" may be used, which hardens without burning in. Such a coating is "washed out" with a special developer which generally contains alcohol.

Figure 18 illustrates a variation in the construction of the screen of Figure 8 by means of which the resist areas 16 may be securely locked to the plate 8. With this arrangement the matrix of Figure 8 is put in a plating bath and metal is plated on the exposed areas 17 until it builds up to have a cross sectional formation as indicated at 30 in Figure 18. It will be seen that the portion 30 overlaps the edges of the resist areas 16 securely locking them on to the plate. In producing a screeen with this matrix the screen is electrolytically deposited directly on top of the portion 30.

Another modified form of matrix may be made from the reverse negative by printing that negative on to a copper plate having a sensitized coating of sensitized albumen of standard formula. The exposed sensitized coating is inked with a suitable greasy ink of which a number of types are well known. The plate is then washed out to remove the soluble portions, then deposited over with rosin powder and "burned in" to form a matrix like that of Figure 8, with the exception that the material of the resist, as represented by the areas 16, is composed of the sensitized coating ink and rosin, as distinguished from the "glue top" resist. Screens may be deposited thereon as before and stripped, a wax parting film being employed as before.

As a further modification a regular engraver's plate or a photo-lithographer's plate may be made from the reverse negative, and from this a print is made in an offset press onto a metal plate which is then powdered with rosin and burned in to provide a matrix which would be quite like that of Figure 8. The intaglio form of matrix is however preferable to those modified forms as noted above, because the resist is thicker and the depositing face is high, and a more resistant type of resist may be used. As is well known these resists gradually become loosened when subjected to the action of the plating bath, which tendency to loosen of course diminishes with the thickness of the resist. There is a tendency for the metal to deposit in the form of small balls on the resist, which tendency is in proportion to the thickness of the resist. In other words, the greater the thickness of the resist material the less there is a tendency for metal to deposit thereon. Likewise, when thin resists are employed there is a tendency for the holes in the screen being deposited to close up due to the fact that the metal deposits so as to overlap the resist. In the intaglio form of matrix the surface from which the screen is to be stripped is the highest part which facilitates stripping and diminishes the tendency of the filling or resist to be damaged during stripping. This is an important advantage of the intaglio matrix. In the production of these screens there is also less tendency of tearing the screen in stripping it from an intaglio matrix.

In making the intaglio matrix certain modifications thereof are sometimes desirable. After the first etching of the matrix to the form shown in Figure 3, which is continued long enough to make the holes relatively deep and the lines relatively thin, and after removing the "tops", the plate is subjected to a second etching which rounds off the top of the lines or spaces between the depressions to give them a form which is clearly illustrated at 18 in Figure 9. The exposed portions of the plate 8, as indicated at 19, are narrower with the result that the lands of the screen build up to give the greatest possible thickness for a given width. In this procedure the width of the spaces 19 is rendered more uniform and this form of matrix is particularly adaptable for the production of certain types of screens where the land is extremely narrow. Furthermore, as will be noted from Figure 9, the form of the depressions 10 is such as to tend to lock the filling 11 in place.

In the production of certain types of screens the matrix of Figure 6 is desirable. This matrix is similar to that of Figure 5 with the exception that the filling material is depressed to a crater-like form, as is clear at 15 in Figure 6. The filling material at the sides of the crater comes up to the same level as the areas 12 and recedes towards the center so that the surfaces of the depressions 10 are entirely covered and protected. The particular form of screen that is formed on this matrix will be referred to later.

A still further modified form of matrix is illustrated in Figure 10. After exposure of the sensitized coating of the plate 8, washing out and burning in the plate is given a deep etch resulting in undercutting of the sides of the depressions 10 as is clear from Figure 10. The resist is then removed from the plate by dissolving it off with sodium cyanide. The depressions in the plate are then filled flush with the surface with a filling material of any of the types previously described. After the filling material is hardened the plate is then given a thin etch so that the exposed areas 20 of the plate are cut away between the fillings 11 to a depth of about 0.001 to 0.0015 inch. The exposed areas 20 are thus below the tops of the filling and provide a matrix which is somewhat similar to that of Figure 8. It will be noted that because of the form of the depressions 10 the filling is locked in place. The areas 20 may, if desired, be given a thin coating of nickel. Screens are deposited on this matrix as before, preferably with the use of a parting film. The form of screen resulting from the use of this matrix will be referred to later.

A still further modified form of matrix is illustrated in Figure 11. The plate 8 is first treated to the point illustrated in Figure 3, and the resist is then dissolved off with sodium cyanide as before. The plate is then etched again long enough to cut down the metal lines between the points where they cross, leaving the crossings high. The surface of the matrix will be apparent from Figure 11.

It may be here noted, as will be apparent to those skilled in the art that in these various etching treatments those portions of the plate 8, namely the side edges and the back, in addition to the areas covered with resist may be protected with any suitable form of coating material such as shellac so that they will not be eaten away during the etching steps. The plate 8 will, as stated, be high at the corners of the areas 21 and will fall away to a low point, as is clear from Figure 11. The depressions 10 are then filled with the filling 11 as before. When this matrix is waxed and has a screen deposited thereon it will be apparent that the screen when stripped therefrom will have a sort of rippled formation allowing a certain amount of stretching of the screen without danger of tearing.

Another form of matrix is that in which the depressions are only partly filled. For example, if the filling is thoroughly rubbed down it is removed to a level below the top faces 12 of the matrix of Figure 5, for example, exposing the sides of the depressions 10 adjacent the faces 12 so that a screen may be deposited on the exposed tops of the lands and down the sides thereof.

Some of the types of screens formed with these matrices are illustrated in Figures 12 to 17 inclusive. A small portion of each of these screens has been illustrated in cross section at S.

In the screen of Figure 12 the lines 30 are of substantially rectangular form with rounded top edges or sort of half oval formation. This form of screen results from the use of the matrix of Figure 5, when the screen is deposited to a sufficient thickness on the matrix.

The screen of Figure 13 is produced on the matrix of the type shown in Figure 4, where the filling 11a is not employed. In other words, the filling 11 only partially fills the depressions 10 but is flat on the top. In this case the lines 31 have grooves 32 formed therein. The metal of the screen depositing around the exposed tops of the matrix lines.

The screen of Figure 14 may be produced on the matrix of Figure 6. In this case the lines 33 are sort of dome shaped formation having the grooves 34 and the downwardly and outwardly flaring portions 35.

The screen of Figure 15 is formed from a screen like Figure 12, which has been taken off very thin, in which such a screen is immersed in a plating bath between a pair of anodes and built up to a form where the lines are of substantially oval cross section, as indicated at 36.

The screen of Figure 16 may be formed by depositing a very thin screen on the matrix of Figure 5, stripping the screen, and giving it an etch in an etching solution such as ferric chloride. It is then built up between a pair of anodes so that the lines become of substantially circular cross section, as shown at 37 in Figure 16. The screen is then given another etch to clean up the holes, and if desired given a light plating of nickel all over.

The procedure in this case is to fasten the thin stripped screen in a Bakelite or other suitable frame. The screen is then washed with sodium cyanide to remove the stripping film or wax. It is then immersed in a plating solution with anodes on both sides thereof and built up with a current density of the order of 35 amperes per square foot. During the plating the holes will naturally tend to close up. For this reason the built up screen, after removal from the plating bath is washed and then immersed in a solution of ferric chloride until the holes are opened up to the desired size. During this etching step the surface of the lines becomes smooth and presents a polished appearance when examined under the microscope. This action of ferric chloride and possibly cupric chloride in the case of copper and brass screens, is peculiar since it dissolves the metal around the inside of the holes without appreciably decreasing the thickness of the screen.

A feature of this etch is that the thin sharp fins which form around the holes are eaten away so rapidly that the material of the lines is not appreciably attacked before the fins are completely removed. This etching operation is of very short duration. Or in other words, is of just long enough duration to eat off the fins and clean up the holes.

The filling up of the holes during deposition of the screen is caused by the formation of sharp edges or points which rapidly etch away in the ferric chloride solution before the thickness of the screen is apparently reduced. In some cases the plating and etching operations may continue alternately until the finished screen has the desired thickness. When a nickel screen is desired it may be produced by disposing alternate thin layers of nickel and copper during the building up of the screen with immersion in the ferric chloride solution after each layer of copper is deposited to etch away the burrs and clean up the holes. The final plating step should be a nickel plating so that the finished screen has a nickeled surface.

The screen of Figure 17 may be formed on the matrices of Figures 8 and 10. In this case the lines 38 will have a half oval top 39 with a depending tongue 40.

Those skilled in the art will readily appreciate the variations in the form of screen which may be produced from the various matrices herein disclosed by varying the manipulation and length of the plating period in accordance with recognized principles.

It is also to be noted that in stripping very thin films from the matrices they may first have a backing sheet of tough paper or the like glued to the exposed face thereof which reduces their tendency to tear while being stripped.

It is again emphasized that the apparatus and procedure herein disclosed may be readily varied by those skilled in the art without departure from the true scope and principles of this invention. I do not, therefore, desire in any sense to be strictly limited to this disclosure which has been given in a purely illustrative sense, but rather to the scope of the invention as defined in the appended claims.

What I seek to secure by United States Letters Patent is:

1. In a method of forming a matrix for electrodeposition of a screen, the steps which comprise applying a light sensitive coating to a plate of metal, printing a design on the coating by exposure thereof to light, washing out the unexposed portions of the coating, etching the unprotected areas of the plate, removing the coating from the plate by means of an etching agent that does not affect the exposed portions, and filling the depressions thus formed in the plate to substantially the top thereof with a material resistant to a given etching agent and to electrolytic deposition, etching the exposed areas of the plate for a desired distance below the top of the material by means of said given etching agent.

2. In a method of producing a foraminous sheet, the lands of which are of channel section, the steps which include producing a matrix which comprise applying a design to a metal plate of chemical resisting material, etching the exposed areas of the plate to the desired depth, removing the resisting design, partially filling the depressions thus formed with material presenting a surface inactive to electrolytic deposition and subjecting the said plate as a cathode to electrolytic action until the resulting deposit on the metallic areas creeps over the edges of said metallic areas and partially covers the surface of the material in the depressions.

3. The method of forming a matrix for electrolytic deposition of a foraminous sheet which comprises applying an etch resisting design to a sheet of metal, etching the exposed areas of the metal to form relatively deep depressions which are undercut at the sides, removing the resisting material, again etching until the edges of the depressions are rounded off and then inserting material in the said depressions that presents a surface inactive to electrolytic deposition in quantities such that it overlies the said rounded edges of said depressions but leaves exposed metallic areas between said depressions, the exposed metal of the sheet having substantially rounded surfaces in cross section.

4. In the method of forming a matrix for electrodeposition of a screen, the steps which comprise making a photographic negative of a half tone screen, applying a light sensitive coating to a plate of metal, printing the negative on to the coating to render portions thereof insoluble, washing out the soluble portions of the coating, etching the plate at the unprotected areas to form depressions, removing the hardened coating, filling the depressions with a non-conducting material, and etching the exposed areas of the plate to a plane below the top plane of the filling material.

5. A matrix comprising a metal plate having a plurality of depressions formed therein, and a filling of insulating material in the depressions to leave areas of the plate exposed in the form of a design, said exposed areas having a nickel coating plated thereon, said coating being locked in the filling material.

6. The method of forming a matrix for the electrolytic deposition of a screen, which comprises the steps of preparing a metallic surface having depressions therein, partially filling the depressions with material that presents a surface inactive to electrolytic deposition, plating the exposed metallic areas with an electrically conductive material until the said electrically conductive material overlies the first mentioned material, and then inserting more of the said first mentioned material until the same overlies the edges of the said electrically conductive material, leaving an exposed area of said electrically conductive material for the reception of an electrolytic deposit.

7. A matrix for receiving an electrolytic deposit of a sheet-like material of a predetermined pattern having voids, said matrix comprising a conductive portion presenting a deposit-receiving area conforming to said pattern, and depressions in the hole-forming areas of said deposit-receiving area, said depressions containing material that presents a surface inactive to electrolytic deposition and the conductive portions overhanging the said depressions and extending into the said material and protected thereby from electrolytic action to which the matrix may be subjected.

8. A matrix for receiving an electrolytic deposit of a sheet-like material of a pattern having voids, said matrix comprising a sheet of metal the surface of which is provided with depressions having overhanging edges, said depressions containing material that presents a surface inactive to electrolytic deposition and covering the overhanging edges and serving as an insulation against electrolytic action to which the matrix may be subjected.

9. In a method of producing a foraminous sheet, the lands of which are of channel section, the steps which include producing a matrix which comprise applying to a metal plate a design in material resistant to the action of a given agent which however acts as a dissolving agent on the metal of the plate, dissolving the material of the exposed areas of the plate to the desired depth by means of the said agent, removing the resisting design and partially filling the depressions with material that presents a surface inactive to electrolytic deposition and completely covers the sides of the depressions and also exhibits a surface of crater-like formation.

10. A matrix to receive an electro-deposition of a foraminous sheet, comprising a metal plate in at least one surface of which there is a plurality of depressions with overhanging edges, the depressions containing material presenting a surface inactive to electrolytic deposition and into which said material the said edges project.

EDWARD O. NORRIS.